H. BAERBALCK.
METAL PLANER.
APPLICATION FILED MAY 4, 1908.

923,930.

Patented June 8, 1909.

Witnesses,
Samuel S. Carr.
James G. Carr.

Hans Baerbalck. Inventor.
By Robert S. Carr. Atty.

UNITED STATES PATENT OFFICE.

HANS BAERBALCK, OF HAMILTON, OHIO, ASSIGNOR TO THE HAMILTON MACHINE TOOL COMPANY, OF HAMILTON, OHIO, A CORPORATION OF OHIO.

METAL-PLANER.

No. 923,930.  Specification of Letters Patent.  Patented June 8, 1909.

Application filed May 4, 1908. Serial No. 430,825.

*To all whom it may concern:*

Be it known that I, HANS BAERBALCK, a citizen of Germany, residing at Hamilton, Ohio, have invented a new and useful Improvement in Metal-Planers, of which the following is a specification.

My invention relates to metal planers, and the objects of my improvement are to provide means for changing the speed of the table in one direction only while its speed in the opposite direction remains constant; to inclose the change gears within the planer bed to protect them from injury and for obviating the usual vibration of the parts; to provide shifting mechanism on the outside of the bed for shifting the gears therein; to provide means for shifting the change gears separately to prevent them from conflicting; and to provide the most durable, simple and compact construction and assemblage of parts for obtaining the greatest facility of operation and efficiency of action. These objects are attained in the following described manner, as illustrated in the accompanying drawings, in which:—

Figure 1:
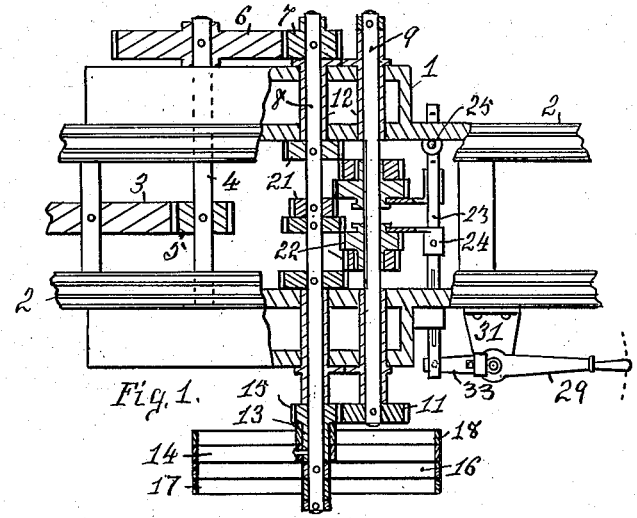
Figure 2:
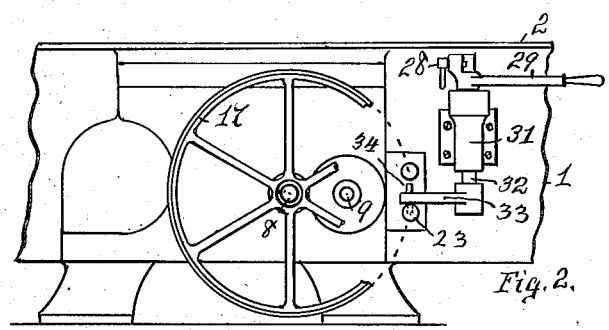

Figure 1 is a horizontal section of portions of a metal planer embodying my improvements; Fig. 2, a side elevation; and Figs. 3 and 4, details of the gear shifting mechanism.

In the drawings, 1 represents the bed of a metal planer provided with shears 2, 3 a bull gear for engaging with a rack for driving the table (not shown), 4 an intermediate shaft provided with pinion 5 engaging gear 3 and with a gear 6 driven from pinion 7 on the driving shaft 8, all being constructed and arranged in the ordinary manner.

The driving shaft 8 and a speed shaft 9 provided with gear 11 are journaled in the bed by means of the usual sleeve bearings 12. A loose sleeve 13 on shaft 8 is provided with a driving pulley 14 and with a pinion 15 in engagement with gear 11 whereby shaft 9 may be driven at a predetermined speed from a belt (not shown) on said pulley. A reversing pulley 16 secured on shaft 8 serves to drive said shaft at a different predetermined speed and in the opposite direction from shaft 9 by means of a separate belt (not shown). The usual idle pulleys 17 and 18 for the belts are mounted on shaft 8 and sleeve 13 as shown in Fig. 1.

A series of different sized spur gears 21 are secured on shaft 8 within the bed and a corresponding series of gears 22 secured together in pairs are splined on shaft 9, shifter rods 23 slidably mounted in the bed movably engage with the respective pairs of gears by means of the usual bracket yokes 24 for sliding the gears 22 on shaft 9 and into or out of engagement with the corresponding gear 21 on shaft 8. Spring catches 25 attached to the bed serve to automatically engage with the notches 26 formed in the shifter rods for yieldingly maintaining them in predetermined positions of longitudinal adjustment with either of the gears 22 in or out of engagement with the corresponding gear 21.

Figures 3, 4:
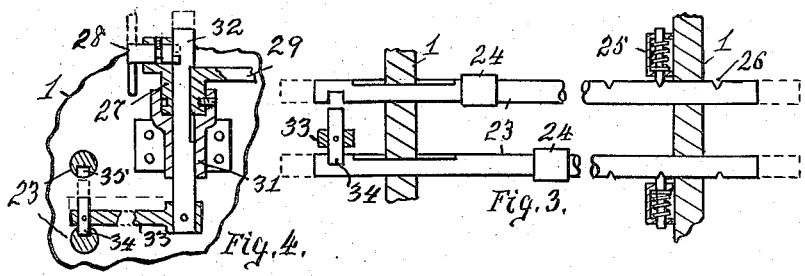

A collar 27 provided with an eccentric pin 28 and with a hand lever 29 is swiveled in a bracket 31 which projects from the bed. A shaft 32 splined in said collar engages with the pin 28 and is thereby movable longitudinally in said collar. An arm 33 secured on shaft 32 is provided with an oppositely projecting stop 34 which is thereby movable into alternate engagement with notches 35 formed in the shifter rods. It is only possible to shift the stop 34 from one of said rods to the other when the rods are in the neutral position with the said notches in registration with each other and with all of the gears 22 disengaged from gears 21 as shown in Figs. 1 and 3. As said stop can only be engaged with one rod after its disengagement from the other, they can only be moved separately thereby that only one of the gears 22 can be engaged at the same time with the corresponding gear 21.

In operation, a predetermined and constant speed in one direction of the bull wheel for the return movement of the table is maintained when one belt is on the reversing pulley 16. When the belts are shifted in the usual manner with the other belt on the driving pulley 14 the direction of shaft 8 and of the bull wheel is reversed for moving the table in a cutting direction and at different predetermined speeds according to the gear 22 which may be engaged with the corresponding gear 21. A quick return speed of the table may be thus secured and different cutting speeds thereof in the opposite direction for different duties may be obtained by shifting the gears 22 with the hand lever which is on the outside of the bed and conveniently accessible to the operator.

Having fully described my improvement, what I claim as my invention and desire to secure by Letters Patent of the United States is:—

1. A metal planer comprising a bed, a main and a secondary shaft journaled therein, independent means for driving said shafts in the same direction and at constant speeds, change speed gear connections between the portion of said shafts within the bed, and means actuated from the outside of the bed and arranged to shift said gears for driving the main shaft in the reverse direction and at different predetermined speeds.

2. A metal planer comprising a bed, a driving and a reversing shaft journaled therein, independent means for driving said shafts at respective constant speeds, change speed reversing gears for the main shaft splined on that portion of the reversing shaft within the bed and adapted to engage with corresponding gears on the main shaft, and a shifting rod extending through the wall of the bed.

3. A metal planer comprising a bed, a series of speed changing gears therein, shifting rods therefor, a bracket bearing mounted on the outside of the bed, a collar swiveled therein and provided with a hand lever, a shaft splined in the collar and provided with an arm, and an eccentric pin journaled in the collar for moving the shaft with the arm alternately into engagement with the rods.

HANS BAERBALCK.

Witnesses:
E. S. RICH,
R. S. CARR.